United States Patent [19]

Einhaus

[11] Patent Number: 4,600,247
[45] Date of Patent: Jul. 15, 1986

[54] HOUSING WITH A DUST COVER HAVING A PIVOTED FRONT

[75] Inventor: Hermanus F. Einhaus, Eindhoven, Netherlands

[73] Assignee: U.S. Philips Corporation, New York, N.Y.

[21] Appl. No.: 599,040

[22] Filed: Apr. 11, 1984

[30] Foreign Application Priority Data

Apr. 19, 1983 [NL] Netherlands ............... 8301365

[51] Int. Cl.⁴ .................................. A47B 81/06
[52] U.S. Cl. ........................... 312/8; 312/284; 312/323
[58] Field of Search ............ 312/284, 8, 9, 12, 10, 312/13, 14, 322, 323, 284; 220/331

[56] References Cited

U.S. PATENT DOCUMENTS 1,330,301 2/1920 Brown ........................ 312/323
3,782,801 1/1974 Zimmermann ............... 312/284

Primary Examiner—William E. Lyddane
Assistant Examiner—Joseph Falk
Attorney, Agent, or Firm—David R. Treacy

[57] ABSTRACT

The cover for an open front portion of a housing is slidable rearward to expose the open front portion, and has a pivotal front wall. The front wall has side walls connected to it, forming a front section, and is coupled to the housing and the rest of the cover such that the front section pivots to bring the front wall into a horizontal position during the first part of the rearward sliding movement.

14 Claims, 9 Drawing Figures

HOUSING WITH A DUST COVER HAVING A PIVOTED FRONT

BACKGROUND OF THE INVENTION

The invention relates to a housing combination, such as the cabinet or case of a record player having a dust cover for closing the upper side of the housing, in which the dust cover comprises a sliding section having a central upper portion and two side portions which adjoin the upper portion and whose lower edges are slidable on the housing near opposing side walls of the housing. In a closed position of the dust cover, a pivotal front section occupies an erect position relative to the bottom wall to close the sliding section at the front. In an open position of the dust cover, the front section has been tilted and slid back together with the sliding section, and is situated in a position substantially parallel to and near the central upper portion of the sliding section.

Such a housing may serve to accommodate a variety of products, for example it may serve as a record-player cabinet or as a storage case for records, the dust cover forming a suitable closure for the housing. After being moved to the horizontal position, the front section can be slid back with the sliding section to give access to the interior of the housing. The advantage of such a dust cover is that it can be opened even when the vertical clearance above the housing is substantially smaller than the clearance required in the case of a housing whose entire dust cover is pivotable, so that the housing can be installed, for example, between two shelves which are situated a small distance above one another.

A known housing of this type is the cabinet of the Dual brand record player "Model KA 61" from Dual Gebruder Steidinger (West Germany). In this known housing the front section, after it has been pivoted, can be slid back together with the sliding section to give access to a part of the turntable and the pick-up arm of the record player, thereby enabling, for example, a record to be put on or to be removed from the turntable.

For its pivotal movement the front section in said known housing is pivotally connected to the upper side of the sliding section. When the dust cover is opened and closed the entire front section is swung through a position in which it is situated perpendicularly above the sliding section. For this movement the clearance above the sliding section should be at least equal to the height of the front section, so that for opening the cover of the known housing a substantial vertical clearance above the dust cover is required.

SUMMARY OF THE INVENTION

It is the object of the invention to construct a housing of the specified type in such a way that for opening the dust cover a minimal clearance above the sliding section is required and the dust cover can be either opened or closed in one continuous movement.

According to the invention the housing is characterized in that the front section is of U-shaped cross-section and comprises a central front portion and two side portions which are slidable on the housing, guide slots are formed in the housing near the front corners of the housing and extend substantially parallel to the direction of sliding of the front section, ends of the guide slots cooperate with the side portions of the front section to control the pivotal movement of this section, and the front section and the sliding section carry coupling means which couple these sections to one another in the horizontal position of the central front portion of the front section in such a manner that the sliding section slides with the front section in the horizontal position of the central front portion of the front section.

Owing to the cooperation of the side portions of the front section with the guide slots in the housing the central front portion of the front section need only be tilted through limited angles relative to the sliding section in order to open the dust cover, the central front portion of the front section being tilted directly from the position, parallel to the central upper portion of the sliding section, without reaching a position in which it is situated far above the central upper portion of the sliding section. Thus, only a minimal clearance above the sliding section is required. The guide slots near the front of the housing ensure that the tilting movement of the front section relative to the other parts of the player is controlled in such a manner that the front section cannot come into contact with parts inside the housing, such as the pick-up head at the front end of the pick-up arm of a record player. Owing to this pivotal movement of the front section and the provision of the coupling means on the front section and the sliding section, the dust cover can be opened and closed quickly and smoothly in one continuous movement in each case, merely requiring the front section to be moved by hand because the sliding section automatically follows this movement. Owing to the small number of simple and easy-to-mount parts this dust cover construction is particularly suitable for mass-manufactured cheap housings such as cabinets or cases of record-players.

A preferred embodiment of the invention is characterized in that the side portions of the side portions of the front section are provided with tilting projections which, in the erect position of the central front portion, project into the guide slots and which upon a manual displacement of the front section in the rearward direction slide over the rear ends of the guide slots. This sliding movement controls the pivotal movement towards the position substantially parallel to the central upper position of the sliding section. Upon the manual displacement of the front section the tilting projections slide over the rear ends of the guide slots, thereby causing the front section to be tilted. This guarantees that the pivotal movement of the front section is always accurately defined relative to the housing so that, for example, the pick-up head of a record player accommodated in the housing can in its rest position be located near the front of the housing without any risk of being damaged. In this respect another embodiment of the invention is characterized in that during the movement of the front section into the erect position the tilting projections abut and subsequently slide on tilting projections at the front ends of the guide slots, which sliding movement controls the pivotal movement of the front section towards the erect position. Thus, during the forward movement also of the front section tilting is effected along the correct path.

Preferably the coupling means comprise parts on the front section and the sliding section which are so arranged relative to each other that the two sections are coupled to each other by these parts only after the front section has been tilted to bring the central front portion thereof into the position substantially parallel to the central upper portion of the sliding section. This construction ensures that during the opening of the dust cover the sliding section can be moved only after completion of the tilting movement of the front section. Thus, the central front portion of the front section is always in the position parallel to the upper portion when it is slid back so that during this sliding movement it cannot come into contact with, for example, the pick-up head of a record player accommodated in the housing.

A preferred embodiment of the invention is characterized in that the grip is situated on the central front portion of the front section and forms part of the coupling means and in the horizontal position of the central front portion abuts the front edge of the central upper portion of the sliding section during the backward movement. Thus, the grip which may serve for lifting and carrying the housing, which, for example, serves as a record-player casing, can also be used for opening and closing the dust cover in a simple and rapid manner.

A further preferred embodiment of the invention is characterized in that viewed perpendicularly to the direction of sliding the side portions of the front section each have a substantially rhombic shape and in the position of the central front portion of the front section substantially parallel to the central upper portion of the sliding section the front section is situated almost wholly underneath the sliding section. This ensures that when the central front portion has been tilted into the position parallel to the upper portion the front section as a whole is situated at substantially the same level as when in the erect position of the central front portion, so that by a correct choice of the height of the sliding section relative to that of the front section the front section can be slid underneath the sliding section. The advantage of this embodiment is that practically no clearance above the sliding section is required for opening the dust cover.

In this respect a further embodiment of the invention, in which a rear portion of the housing is covered by a fixed cover, is characterized in that the side portions of the sliding section have a height such that in the open position of the dust cover the sliding section and the front section are situated almost wholly underneath the fixed cover. This enables another housing such as, for example, the cabinet of a radio or amplifier, to be placed on the fixed cover, so that the housing in accordance with the invention is particularly suitable for use in compact hi-fi systems. A preferred embodiment of the invention which is particularly suitable for use as a case for the storage of articles of various types is characterized in that the opposing side walls and each formed with a ridge in which is formed a guide slot. This results in a correct guidance of the front section during its pivotal movement, the parts which assist in this guidance occupying a minimal space on the housing.

Three embodiments of the invention will now be described in more detail, by way of example, with reference to the drawings,

DESCRIPTION OF THE PREFERRED EMBODIMENTS

Figure 1:
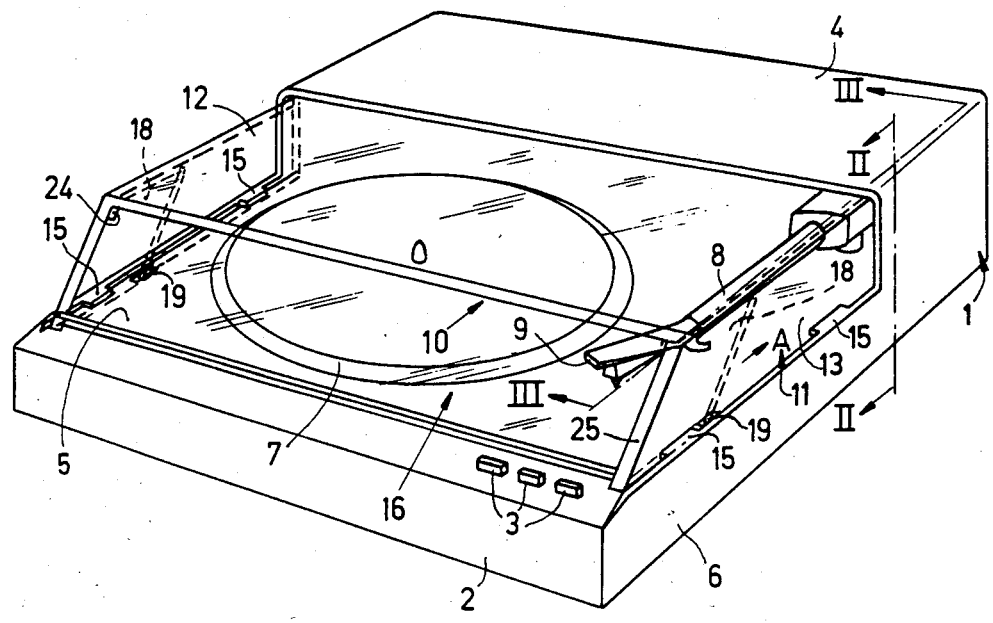
FIG. 1 is a perspective view of a first embodiment of the invention in the form of a record-player housing.

The housing 1 shown in FIG. 1 is a record-player housing which carries some control buttons 3 near a front wall 2. Near the back the housing 1 is provided with a fixed cover 4, so that at the back the housing is closed. Further, the housing 1 comprises a bottom wall 5 and two opposing side walls 6, of which only the right-hand side wall 6 is visible in FIG. 1.

A turntable 7 is rotatably supported in the wall 5. This wall also carries a pivotable pick-up arm 8 which projects forwards from the space bounded by the fixed cover 4 and whose front end carries a pick-up head 9.

Figure 2:
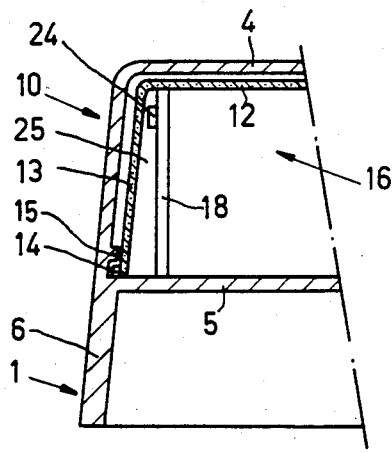
FIG. 2 is a sectional view of a part of the housing, taken on the line II—II in FIG. 1.

The part of the upper side of the housing which is not covered by the fixed cover 4 can be closed by a movable dust cover 10. The dust cover 10 comprises a sliding section 11 of inverted U-shaped cross-section comprising a central upper portion 12 and two side portions 13 adjoining the upper portion. As is shown in FIGS. 1 and 2, the side portions 13 are slidably guided on the housing 1 near the upright side walls 6, the side portions comprising laterally projecting ridges 14 which are sliding guided by guides 15 on the walls 6. In addition, the dust cover 10 comprises a front section 16 which is U-shaped in cross-section and which comprises a central front portion 17 and two side portions 18 adjoining the front portion. As is shown in FIG. 3, the side portions 18 are slidable on the wall 5 of the housing 1, inside the side portions 13 of the sliding section 11 of the dust cover.

Figure 3A:
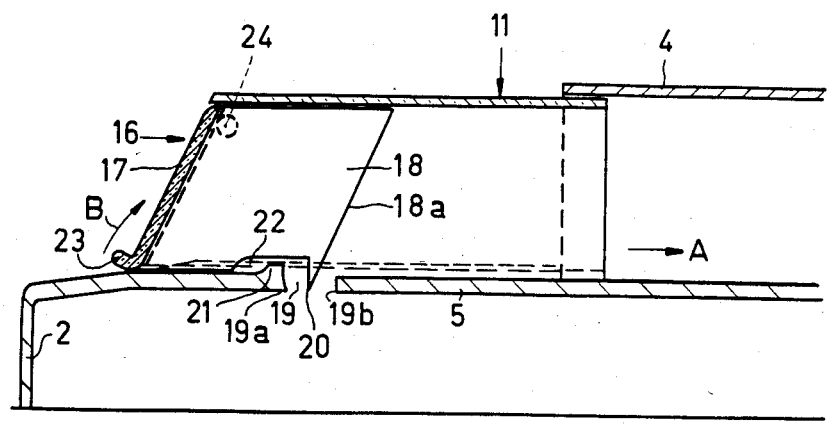
FIG. 3 is a sectional view of a part of the housing, taken on the line III—III in FIG. 1, FIG. 3A showing the closed position of the dust cover of the housing, FIG. 3B showing the open position of the dust cover, and FIG. 3C showing an intermediate position of the dust cover during the closing of the dust cover.

Near the front corners of the housing 1 the wall 5 is formed with guide slots 19 which extend substantially parallel to the direction of sliding of the front section 16 and the sliding section 11 of the dust cover 10, which direction is indicated by the arrow A in FIG. 1. These guide slots 19 have ends 10a and 19b which in cooperation with the side portions 18 of the front-section 16 control a tilting movement of the front section 16 in a manner to be described hereinafter. For this purpose each side portion 18 is provided with a tilting projection 20. When the central front portion 17 of the front section 16 is in an erect position in which it closes the front of the sliding section 11, as shown in FIG. 3A, the projections 20 project into the guide slots 19 at locations such that they are clear of the ends 19a and 19b, respectively of the slots. At the ends 19a tilting projections 21 are provided on the bottom wall 5 of the housing 1.

The tilting projections 21 project from the upper surface of the wall 5 and in the position of the dust cover 10 shown in FIG. 3A extend into recesses 22 in the lower edges of the side portions 18 of the front section 16 of the dust cover.

Figure 3B:
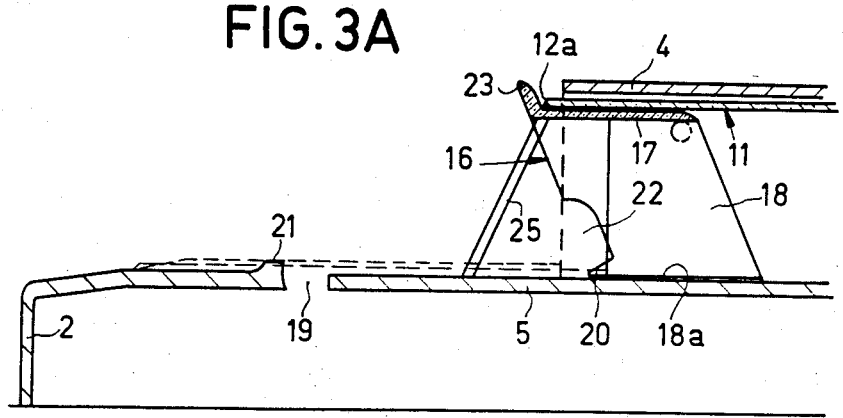

The central front portion 17 of the front section 16 has a lip 23 on its lower edge 23 which serves as a grip for moving the front section. The side portions 18 of the front section 16 carry projections 24 on their outer sides, which projections form part of a coupling means between the front section 16 and the sliding section 11 of the dust cover and as the front section 16 is slid in a direction opposite to that indicated by the arrow A abut inwardly projecting edge portions 25 at the front of the side portions 13 of the sliding section 11. Viewed perpendicularly to the direction A of sliding as indicated in FIG. 3, the side portions 18 of the front section 16 have a substantially rhombic shape, so that they can be slid almost wholly underneath the sliding section 11 in a horizontal position of the central front portion 17, as is shown in FIG. 3B, i.e. a position substantially parallel to the central upper position 1, 2 of the sliding section 11.

As is shown in FIG. 3A, the sliding section 11 and the front section 16 of the dust cover 10 in the record player in accordance with the invention shield at least the front part of the upper side of the record player against dust and also protect the pick-up head 9 and other parts of the record player. In this closed position of the dust cover the central front portion 17 of the front section 16 occupies an erect position, the grip 23 resting on the wall 5 near the front of this wall. The dust cover is opened by manually moving the grip 23 in the direction indicated by the arrow B in FIG. 3A, so that the tilting projections 20 are first slid against the rear ends 19b of the guide slots 19 and then slide over these ends of the slots as the front section 16 is moved further back. Since this is effected simultaneously for the tilting projections 20 on both the left-hand and the right-hand side portions 18 of the front section 16, it results in a tilting movement of the front section which proceeds smoothly so that jamming is precluded. As the manual displacement of the front section 16 continues and the tilting projections 20 slide over the ends 19b of the slots 19, the rhombic side portions 18 of the front section 16 and tilted into a position in which their edges 18a which adjoin the tilting projections 20 lie on the upper surface of the wall 5. In this position the grip 23 abuts the front edge 12a of the central upper portion 12 of the sliding section 11. Thus, the grip 23 and the front edge 12a constitute coupling means whereby during a continuous manual displacement of the front section 16 the sliding section 11 also is moved in a rearward direction as indicated by the arrow A in FIG. 1. The edges 18a of the side portions 18 of the front section 16 and the lower edges of the side portions 13 of the sliding section 11 then slide over the wall 5 of the housing 1. In the horizontal position of the central front portion 17 of the front section 16, in which position the portion 17 is situated directly underneath and parallel to the central upper portion 12 of the sliding section 11 owing to the shape of the side portions 18, it is ensured that an accurately guided movement is obtained in such a manner that contact between the front section 16 and the pick-up head 9 or the pick-up arm 8 is precluded. In the end position shown in FIG. 3B, the sliding section 11 and the front section 16 are situated almost wholly underneath the field cover 4. Thus, it is possible to open the dust cover in such a manner that no additional clearance above the cover 4 is required. This enables another piece of equipment to be placed on the cover 4, or the record-player to be installed between two shelves which are situated at a short distance above each other.

Figure 3C:
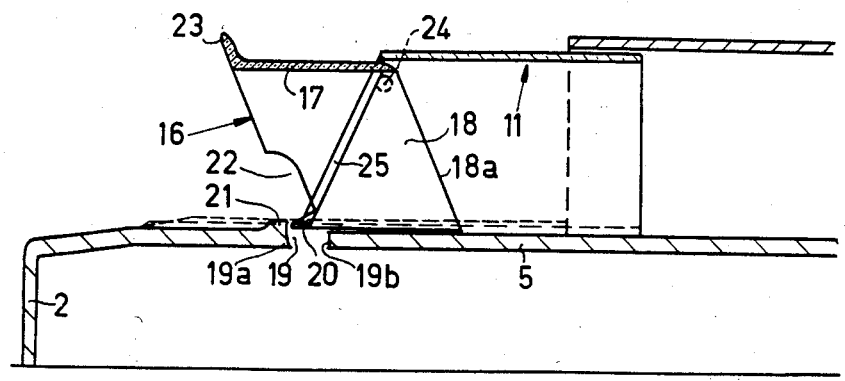

When the dust cover is to be returned to the closed position the grip 23 is held and pulled forward so that the front section 16 of the cover is slid in a direction opposite to that indicated by the arrow A. The coupling means comprising the front edge portions 25 of the side portions 13 of the sliding section 11 and the projections 24 on the side portions 18 of the front section 16 couple the two sections 11 and 16 to each other in such a manner that, with the central front portion 17 of the front section 16 in the horizontal position, the sliding section 11 is moved forward with the front section. This sliding movement of the two section continues until the position shown in FIG. 3C is reached, in which the tilting projections 20 on the front section 16 abut the projection 21 on the wall 5 of the housing 1. As a result of this abutment, as the grip 23 is moved further the front section swings downwards, the projections 24 sliding down the edge portions 25 and in so doing moving the sliding section 11 further forwards. During the sliding movement of the tilting projections 20 down the tilting projections 21, which is effected at an accurately defined location relative to the other parts of the record-player housing owing to the specific location of the tilting projections 21, the front section 16 swings over the pick-up head 9 in such a manner that it cannot come into contact with this head. When the movement of the front section is completed, the central front portion 17 of this section will have returned to the erect position shown in FIG. 3A and the dust cover will again be in the closed position.

Figure 4:
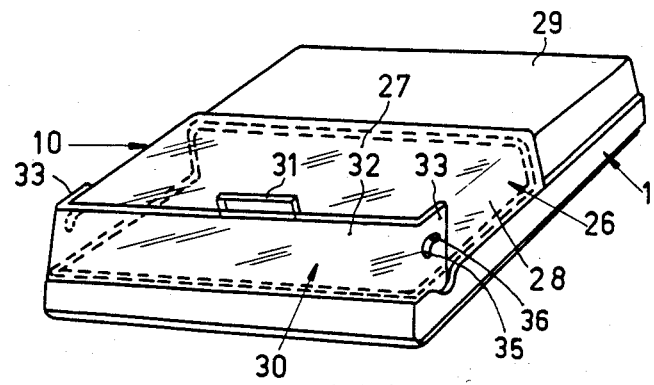
FIG. 4 is a perspective view of a second embodiment of the invention in the form of a record-player housing.
Figure 5:
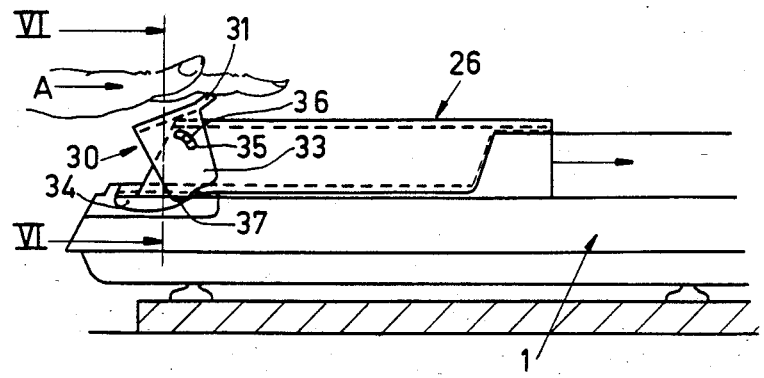
FIG. 5 shows a part of the housing shown in FIG. 4 during the opening of the dust cover.

The embodiment in the form of a record-player housing shown in FIG. 4 comprises a sliding section 26 which is also of inverted U-shaped cross-section and comprises a central upper portion 27 and two side portions 28 adjoining the upper portion. This embodiment differs from the first embodiment in that the sliding section 26 slides over a fixed cover 29 instead of underneath this fixed cover. The present embodiment comprises a front section 30 which is provided with a grip 31 at the top. This front section is also of U-shaped cross-section and comprises a central front portion 32 and two side portions 33 adjoining the front portion. Again the housing 1 is formed near its front corners with two guide slots 34 whose ends again cooperate with the side portions 33 of the front section 30 to guide the tilting movement of this section. For coupling the sections 26 and 30 to one another there is provided a coupling means comprising an arcuate slot 35 in each of the side portions 33 of the front section 30 and a pin 36 on each of the side portions 28 of the sliding section 26, the pins being slidable one in each slot. To open the dust cover, as is shown in FIG. 5, the grip 31 is moved backwards in the direction indicated by the arrow A, the resulting sliding movement of tilting projections 37 on the side portions 33 of the front section 30 over the rear ends of the guide slots 34 causing the front section 30 to be tilted in a controlled manner and the central front portion 32 of the front section to be moved from an erect position to a horizontal position. When this horizontal position has been reached, each pin 36 is situated in an end portion of the associated slot 35, the front section 30 and the sliding section 26 thereby being coupled to one another so that they are moved back together as the movement of the front section is continued. The movement of the dust cover requires a minimal clearance above the dust cover so that, as in the first embodiment, the dust cover in the present embodiment, the dust cover in the present embodiment also can be slid back and the record-player housing may be installed between two shelves which are situated a small distance above each other. The dust cover returned to the closed position by moving the grip 31 in a direction opposite to that indicated by the arrow A, side portions 28 and 33 of the two sections 26 and 30 of the cover again sliding forward until the tilting projections 37 on the side portions 33 have reached the guide slots 34 and are guided over the rear ends of the guide slots. Thus, as the movement continues the front section 30 is swung down again, the pins 36 being moved towards the other ends of the slots 35. This ensures that also in the present embodiment a continuous movement is obtained in such a manner that no contact with the pick-up head is possible.

It is emphasized that the grip 23 and 31 in the first and second embodiments respectively may be made larger so that it may serve for carrying the housing, which in the present example is used for accommodating a record player.

Figure 7:
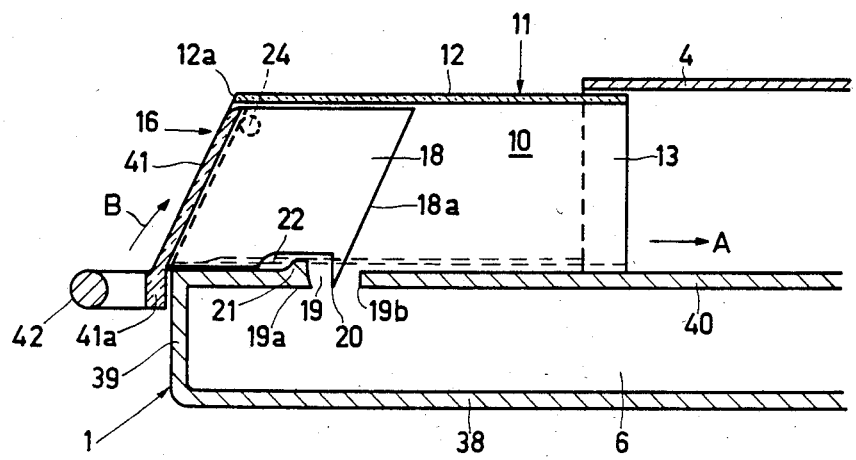
FIG. 7 is a sectional view of a part of a third embodiment of the invention in the form of a storage case.

FIG. 7 shows a housing in the form of a storage case for gramophone records, which housing has a construction derived from that of the first embodiment, corresponding parts bearing the same reference numerals as in FIGS. 1 to 3. The housing 1 comprises a bottom wall 38 which is integral with the upright side walls 6, a rear wall and a front wall 39, and the fixed cover 4. On the inner surface of each side wall 6 a ridge 40 is formed, which ridge extends parallel with the bottom wall 38 and has a small width measured at right angles to the plane of the side wall 6. The side portions of the sliding section 11 and the front section 16 of the dust cover 10 are slidable on the ridges 40. In each ridge 40 a guide slot 19 is formed, which slot is open to one side and has ends 19a and 19b. At the end 19a of each slot a tilting projection 21 is formed on the upper side of the respective ridge 40. The front section 16 comprises a central front portion 41 of which a part 41a extends over a part of the front wall 39 of the housing when the front section is in the closed position. The part 41a is formed with a grip 42 by means of which the housing can be lifted and carried about when the front section 16 is in the closed position. The grip 42 has the same function in opening and closing the dust cover 10 as the grip 23 in the first embodiment. This has the advantage that immediately after the housing has been put down the grip 42 may be used for opening the cover and after the dust cover has been closed this grip 42 may be used for lifting the housing. Preferably, the front section 16 is latched to the housing 1 in its closed position in a manner not shown, for example near the grip 42, in order to avoid an unfavourable loading of the dust cover 10 when the housing is lifted. The ridges 40 occupy only a minimal space in the housing and therefore do not impede the storage of the items to be stored. The present embodiment is particularly suitable for the convenient and dust-tight storage and transport of various types of article such as gramophone records, documents etc.

Figure 6:
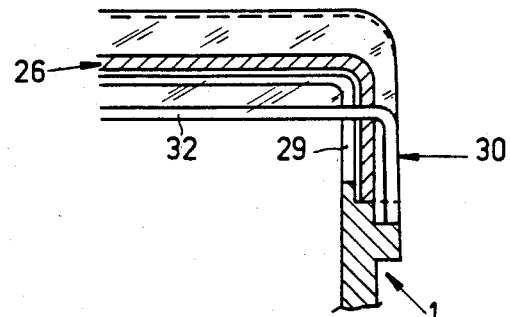
FIG. 6 is a partly sectional view taken on the lines VI—VI in FIG. 5.

It is to be noted that the housing 1 with the dust cover 10 shown in FIGS. 4-6 may also be used as a storage case in a manner not shown but similar to that shown in FIG. 7. This has the additional advantage that the dust cover 10 can be slid over the fixed cover 29, so that sliding can be effected over the outside of the housing.

What is claimed is:

1. The combination of a housing having opposed side walls, a bottom wall and an open upper side at a front portion of the housing between said side walls, and a dust cover slidable rearward from an open position to a closed position for closing said upper side, wherein said dust cover comprises a sliding section having a central upper portion and two side portions arranged so as to have an inverted U-shaped cross-section, said side portions adjoining the upper portion and having lower edges slidable on the housing near said side walls; and a pivotal front section connected to said sliding section, and in said closed position the front section is in an erect position relative to the bottom wall and closes the sliding section at the front; in said open position the sliding section is slid rearward and said front section is pivoted from said erect position such that at least a part of the front section is in a horizontal position substantially parallel to and adjacent said central upper portion, characterized in that the front section comprises a central front portion and two side portions, arranged to have a U-shaped cross-section, said side portions being slidable on the housing, said housing has two guide slots formed therein near front corners of the housing, extending substantially parallel to the direction of sliding of the front section, said slots having ends arranged to engage said front section side portions to control the pivotal movement of the front section, and the cover comprises coupling means for coupling the front section to the sliding section, arranged such that when said central front section is in said horizontal position the front section and sliding section are slidable over a limited distance with respect to each other in the direction of sliding movement of the sliding section, and slide together over at least a part of the sliding movement of the sliding section between the open and closed positions.

2. A combination as claimed in claim 1, characterized in that said slots each have respective front and rear ends; each side portion of the front section comprises a tilting projection which, in the erect position of the central front portion, projects into a respective guide slot, and which, upon manual displacement of the front section, slides over the rear end of the respective guide slot to control the pivotal movement toward the horizontal position of the central front section.

3. A combination as claimed in claim 2, characterized in that the guide slot front ends each have a respective tilting projection; and in that the tilting projections at the front ends of the guide slots and the tilting projections on the side portions are so arranged that, during forward movement of the front section the tilting projections on the side portions abut and subsequently slide on the respective tilting projections at the front ends of the guide slots so as to pivot the front section towards the erect position.

4. A combination as claimed in claim 1, 2 or 3, characterized in that said coupling means comprises a front section coupling part and a sliding section coupling part which engage each other only when the front section is tilted such that the central front portion is in a position substantially parallel to the upper portion of the sliding section.

5. A combination as claimed in claim 4, characterized by comprising a grip disposed on the central front portion of the front section, said grip forming part of said coupling means and being disposed such that, when the central front portion is in the horizontal position, during rearward movement of the sliding section said grip abuts a front edge of the central upper portion.

6. A combination as claimed in claim 1, 2 or 3, characterized in that said side portions of the front section include projections which form part of the coupling means; and in that said side portions of the sliding section comprise edge portions which project toward the respective adjacent front section side portion, said projections and respective projective edge portions being arranged such that sliding forward movement of the front section, from its rearmost position, brings said projections on the front sections into engagement with said projecting edge portions so that further forward sliding movement of the front section causes the sliding section to slide forward.

7. A combination as claimed in claim 1, 2 or 3, characterized in that said coupling means comprises an arcuate slot formed in one of said sliding and front sections, and a pin on a side portion of the other of said sections, said pin engaging slidably in said slot, said pin and actuate slot also controlling the pivotal movement of the front section.

8. A combination as claimed in claim 7, characterized in that, viewed perpendicularly to said front section side portions, said front section side portions each have a substantially rhombic shape; and in that said front section side portions are so arranged that, when the central front portion is pivoted to be fully parallel to the central upper portion of the sliding section, the front section is situated almost wholly underneath the sliding section.

9. A combination as claimed in claim 8, in which the housing has a rear portion and a fixed cover covering said rear portion, characterized in that said side portions of the sliding section have a height such that, in the open position of the dust cover, the sliding section and the front section are situated almost wholly underneath the fixed cover.

10. A combination as claimed in claim 9, characterized in that said opposing side walls of the housing each have a ridge defining a slot for guiding at least said sliding section.

11. A combination as claimed in claim 4, characterized in that, viewed perpendicularly to said front section side portions, said front section side portions each have a substantially rhombic shape; and in that said front section side portions are so arranged that, when the central front portion is pivoted to be fully parallel to the central upper portion of the sliding section, the front section is situated almost wholly underneath the sliding section.

12. A combination as claimed in claim 11, in which the housing has a rear portion and a fixed cover covering said rear portion, characterized in that said side portions of the sliding section have a height such that, in the open position of the dust cover, the sliding section and the front section are situated almost wholly underneath the fixed cover.

13. A combination as claimed in claim 1, characterized in that, viewed perpendicularly to said front section side portions, said front section side portions each have a substantially rhombic shape; and in that said front section side portions are so arranged that, when the central front portion is pivoted to be fully parallel to the central upper portion of the sliding section, the front section is situated almost wholly underneath the sliding section.

14. A combination as claimed in claim 13, in which the housing has a rear portion and a fixed cover covering said rear portion, characterized in that said side portions of the sliding section have a height such that, in the open position of the dust cover, the sliding section and the front section are situated almost wholly underneath the fixed cover.

* * * * *